United States Patent
Vlasov

(10) Patent No.: US 12,373,045 B2
(45) Date of Patent: Jul. 29, 2025

(54) ROTARY TOUCH DETECTION IN AN INPUT DEVICE

(71) Applicant: Logitech Europe S.A., Lausanne (CH)

(72) Inventor: Maxim Vlasov, Geneva (CH)

(73) Assignee: Logitech Europe S.A., Lausanne (CH)

( * ) Notice: Subject to any disclaimer, the term of this patent is extended or adjusted under 35 U.S.C. 154(b) by 100 days.

(21) Appl. No.: 18/194,457

(22) Filed: Mar. 31, 2023

(65) Prior Publication Data

US 2024/0329761 A1  Oct. 3, 2024

(51) Int. Cl.
| | |
|---|---|
| *G06F 3/0362* | (2013.01) |
| *G06F 3/02* | (2006.01) |
| *G06F 3/03* | (2006.01) |
| *G06F 3/0354* | (2013.01) |
| *G06F 3/038* | (2013.01) |
| *G06F 21/83* | (2013.01) |

(52) U.S. Cl.
CPC .......... *G06F 3/0362* (2013.01); *G06F 3/0312* (2013.01); *G06F 3/03543* (2013.01); *G06F 3/0383* (2013.01); *G06F 3/0213* (2013.01); *G06F 3/0227* (2013.01); *G06F 3/03547* (2013.01); *G06F 21/83* (2013.01)

(58) Field of Classification Search
CPC .. G06F 3/0362; G06F 3/0312; G06F 3/03543; G06F 3/0213; G06F 3/0227; G06F 3/03547; G06F 21/83
See application file for complete search history.

(56) References Cited

U.S. PATENT DOCUMENTS

| | | | | |
|---|---|---|---|---|
| 5,841,428 A | * | 11/1998 | Jaeger .................. | G02F 1/13306 345/184 |
| 5,936,613 A | * | 8/1999 | Jaeger .................. | G02F 1/13306 345/184 |
| 6,847,350 B2 | * | 1/2005 | Van Brocklin ..... | G06F 3/03543 345/157 |
| 7,545,367 B2 | * | 6/2009 | Sunda .................... | G06F 3/016 345/184 |
| 9,715,532 B1 | * | 7/2017 | Hall ..................... | G06F 16/9535 |
| 9,904,380 B2 | * | 2/2018 | Park ....................... | G06F 3/0362 |
| 10,082,893 B2 | * | 9/2018 | Yun ........................ | G01D 5/145 |
| 10,095,261 B2 | * | 10/2018 | Hayashi ................ | G06F 3/0362 |
| 10,275,055 B2 | * | 4/2019 | Bruwer ................ | G01D 5/2013 |

(Continued)

*Primary Examiner* — Michael J Jansen, II
(74) *Attorney, Agent, or Firm* — Kilpatrick Townsend & Stockton LLP

(57) ABSTRACT

A method comprises receiving rotation data from a sensor configured to detect a rotation of a rotary device on a computer peripheral device, calculating a predicted rotational state of the rotary device after a period of time based on the rotation data and physical characteristics of the rotary device, and receiving updated rotation data from the sensor after the period of time. The method further includes calculating a difference between the predicted rotational state and an instant rotational state of the rotary device, the instant rotational state based on the updated rotation data and determining that a touch event has occurred on the rotary device when the calculated difference between the predicted rotational state and the instant rotational state is greater than a difference threshold value. The rotation data can include at least one of angular position data, angular velocity data, or angular acceleration data.

20 Claims, 7 Drawing Sheets

(56) References Cited

U.S. PATENT DOCUMENTS

| | | | |
|---|---|---|---|
| 10,996,770 B2* | 5/2021 | McLoughlin | G06F 3/03543 |
| 11,347,326 B2* | 5/2022 | Chauvin | G06F 3/0383 |
| 11,656,694 B2* | 5/2023 | McLoughlin | G06F 3/0383 |
| | | | 345/163 |
| 11,747,907 B2* | 9/2023 | Orita | G06F 3/0393 |
| | | | 345/174 |
| 11,989,361 B1* | 5/2024 | Vlasov | G06F 3/03543 |
| 11,995,248 B2* | 5/2024 | Jung | H04N 21/42204 |
| 2003/0103044 A1* | 6/2003 | Sunda | G06F 3/0362 |
| | | | 345/184 |
| 2003/0117370 A1* | 6/2003 | Van Brocklin | G06F 1/1616 |
| | | | 345/156 |
| 2006/0258390 A1* | 11/2006 | Cui | G06F 3/0482 |
| | | | 455/90.3 |
| 2016/0252979 A1* | 9/2016 | Yun | G01D 5/58 |
| | | | 345/184 |
| 2016/0252980 A1* | 9/2016 | Park | G01D 5/56 |
| | | | 345/184 |
| 2017/0052557 A1* | 2/2017 | Hayashi | H03K 17/962 |
| 2017/0285768 A1* | 10/2017 | Bruwer | G01D 5/2013 |
| 2020/0004352 A1* | 1/2020 | McLoughlin | G06F 3/038 |
| 2021/0357041 A1* | 11/2021 | McLoughlin | G06F 3/038 |
| 2021/0373678 A1* | 12/2021 | Chauvin | G06F 3/0383 |
| 2023/0004225 A1* | 1/2023 | Orita | G06F 3/0488 |
| 2024/0019943 A1* | 1/2024 | Jung | G06F 3/0485 |
| 2024/0329761 A1* | 10/2024 | Vlasov | G06F 3/0362 |

\* cited by examiner

ROTARY TOUCH DETECTION IN AN INPUT DEVICE

BACKGROUND

The computer mouse and keyboard have been long established as quintessential tools for facilitating efficient interfacing between human and modern personal computing devices. Both keyboards and computer mice have undergone significant improvements over the course of the last several decades. Some computer mice, for instance, are designed for high performance gaming with high communication rates, high accuracy, and precision with movement sensing (e.g., optical sensor(s)) and input detection (e.g., buttons, scroll wheels), and light weight. Some are designed for productivity and may include multiple programmable buttons that can be accessible by a thumb or multiple fingers, added functionality such as switching between multiple host computing devices, and other useful features. Some improvements relate to better ergonomics (e.g., surface contouring, improved button response), tracking accuracy (e.g., higher dots-per-inch (DPI) settings, tracking on glass, etc.), faster communication (e.g., with a communicatively coupled host computing device), improved robustness and longevity, and changing a feedback profile on a scroll wheel, including profiles such as freewheel, ratcheting, linear, and constant force feedback. Keyboards have undergone significant improvements as well, with higher quality key switches and greater keyboard functionality including the addition of scroll bars (often referred to as "shuttle controls, "dog bones," and the like), media controls, and more.

Despite the many advancements in functionality and user experience in computer interface devices (e.g., computer mice, keyboards, remote controls, gaming controls, etc.), improvements are needed to support more dynamic and real-time control options for a better interactive user experience.

BRIEF SUMMARY

In some embodiments, a method can comprise receiving rotation data from a sensor configured to detect a rotation of a rotary device on a computer peripheral device, calculating a predicted rotational state of the rotary device after a period of time based on the rotation data and physical characteristics of the rotary device, receiving updated rotation data from the sensor after the period of time, calculating a difference between the predicted rotational state and an instant rotational state of the rotary device (the instant rotational state based on the updated rotation data), and determining that a touch event has occurred on the rotary device when the calculated difference between the predicted rotational state and the instant rotational state is greater than a difference threshold value. In some implementations, the rotation data includes at least one of angular position data, angular velocity data, or angular acceleration data. The sensor may be a Hall-Type Sensor, optical sensor, or other suitable sensing device configured to detect movement of the rotary device in at least two dimensions including a first dimension of the at least two dimensions that is an axis of rotation for the rotary device and includes the at least one of the angular position, velocity, or acceleration data, and translational movement along the first dimension and a second dimension of the at least two dimensions that is orthogonal to the first dimension and includes translational movement along the second dimension, wherein determining that a touch event has occurred on the rotary device is further based on translational movement along the first or second dimension that is beyond a translational movement threshold.

In some aspects, the sensor is further configured to detect translational movement of the rotary device in a third dimension that is orthogonal to the first and second dimensions, wherein determining that a touch event has occurred on the rotary device is further based on translational movement along the third dimension. In some embodiments, the physical characteristics of the rotary device include at least one of rotary device dimensions, rotary device mass, rotary device weight distribution, rotary device material (e.g., material type, material properties, etc.), rotary device rotational friction, and rotary device initial rotational position. In certain embodiments, the computer peripheral device is a computer mouse or a keyboard, and the rotary device is a scroll wheel, scroll bar, or rotary element.

In certain embodiments, a system comprises one or more processors, and one or more non-transitory, computer-readable storage mediums containing instructions configured to cause the one or more processors to perform operations including: receiving rotation data from a sensor configured to detect a rotation of a rotary device on a computer peripheral device; calculating a predicted rotational state of the rotary device after a period of time based on the rotation data and physical characteristics of the rotary device, receiving updated rotation data from the sensor after the period of time, calculating a difference between the predicted rotational state and an instant rotational state of the rotary device, the instant rotational state based on the updated rotation data, and determining that a touch event has occurred on the rotary device when the calculated difference between the predicted rotational state and the instant rotational state is greater than a difference threshold value. In some aspects, the rotation data includes at least one of angular position data, angular velocity data, or angular acceleration data. The sensor can be a Hall-Type Sensor (or optical, or other suitable type of sensor) configured to detect movement of the rotary device in at least two dimensions including a first dimension of the at least two dimensions that is an axis of rotation for the rotary device and includes the at least one of the angular position, velocity, or acceleration data, and translational movement along the first dimension and a second dimension of the at least two dimensions that is orthogonal to the first dimension and includes translational movement along the second dimension, wherein determining that a touch event has occurred on the rotary device is further based on translational movement along the first or second dimension that is beyond a translational movement threshold.

In some cases, the sensor is further configured to detect translational movement of the rotary device in a third dimension that is orthogonal to the first and second dimensions, wherein determining that a touch event has occurred on the rotary device is further based on translational movement along the third dimension. In certain implementations, the physical characteristics of the rotary device include at least one of rotary device dimensions, rotary device mass, rotary device weight distribution, rotary device material, rotary device rotational friction, and rotary device initial rotational position. In certain embodiments, the computer peripheral device may be a computer mouse or a keyboard and the rotary device may be a scroll wheel, scroll bar, or rotary element.

In further embodiments, a non-transitory computer-readable medium containing program instructions for causing one or more processors to perform operations including:

receiving rotation data from a sensor configured to detect a rotation of a rotary device on a computer peripheral device; calculating a predicted rotational state of the rotary device after a period of time based on the rotation data and physical characteristics of the rotary device; receiving updated rotation data from the sensor after the period of time; calculating a difference between the predicted rotational state and an instant rotational state of the rotary device, the instant rotational state based on the updated rotation data; and determining that a touch event has occurred on the rotary device when the calculated difference between the predicted rotational state and the instant rotational state is greater than a difference threshold value. The rotation data can include at least one of angular position data, angular velocity data, or angular acceleration data. In some aspects, the sensor is a Hall-Type Sensor, an optical sensor, or other suitable type of sensor configured to detect movement of the rotary device in at least two dimensions including a first dimension of the at least two dimensions that is an axis of rotation for the rotary device and includes the at least one of the angular position, velocity, or acceleration data, and translational movement along the first dimension and a second dimension of the at least two dimensions that is orthogonal to the first dimension and includes translational movement along the second dimension. In some cases, determining that a touch event has occurred on the rotary device is further based on translational movement along the first or second dimension that is beyond a translational movement threshold.

In some aspects, the sensor may be further configured to detect translational movement of the rotary device in a third dimension that is orthogonal to the first and second dimensions, wherein determining that a touch event has occurred on the rotary device is further based on translational movement along the third dimension. The physical characteristics of the rotary device include at least one of rotary device dimensions, rotary device mass, rotary device weight distribution, rotary device material, rotary device rotational friction, and rotary device initial rotational position. In some aspects, the rotary device can be a scroll wheel, scroll bar, or rotary element and the rotary device may be a scroll wheel, scroll bar, or rotary element.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
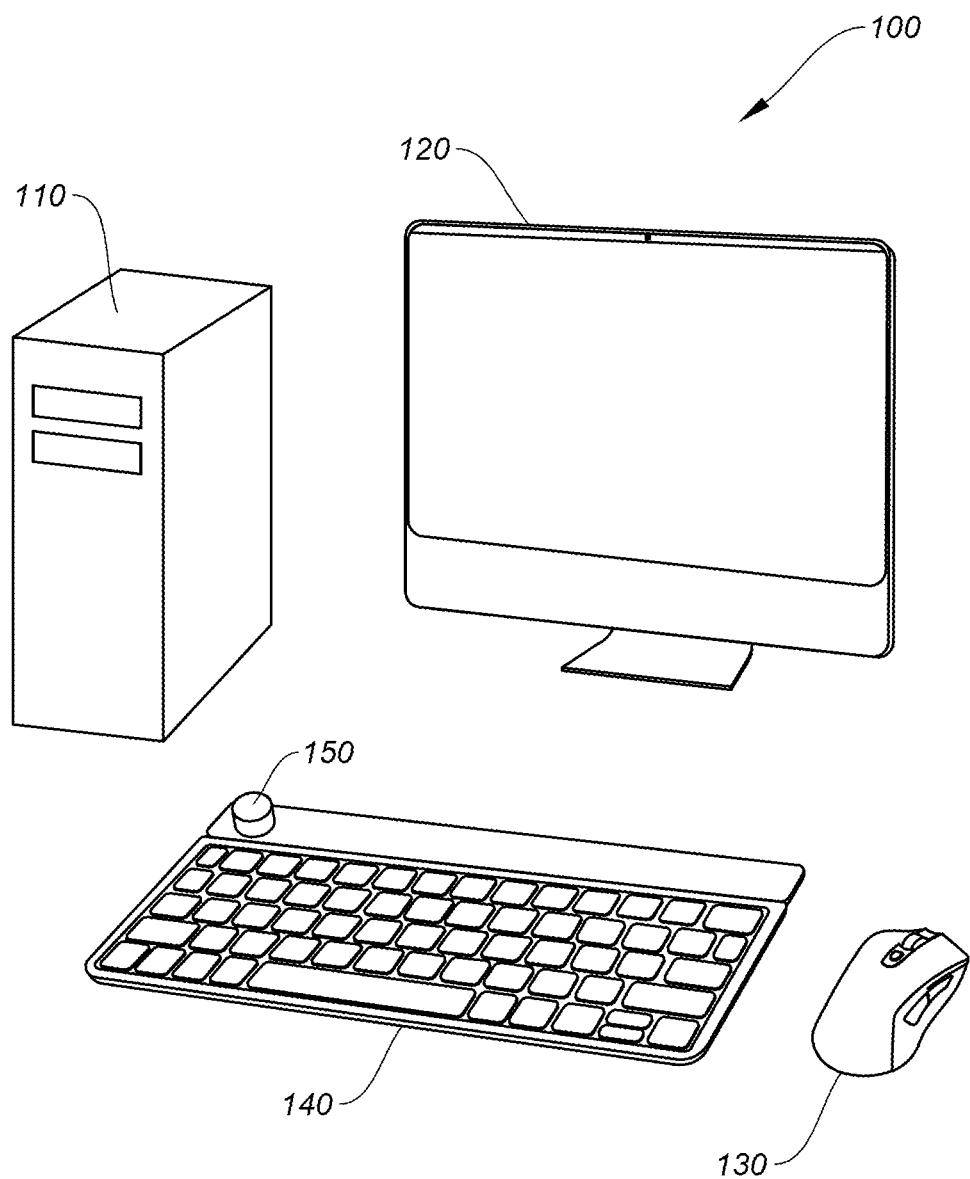
FIG. 1 shows a simplified example of a computer system that can include any of a variety of host computing devices and computer peripheral devices, including computer peripheral devices (e.g., a computer mouse) that can be configured to perform aspects of the various inventive concepts described herein.

Aspects of the present disclosure relate generally to computer peripheral devices, and more particularly to rotary touch detection in an input device, according to certain embodiments.

In the following description, various examples of computer peripheral devices (e.g., computer mice, keyboards, etc.) are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

The following high-level summary is intended to provide a basic understanding of some of the novel innovations depicted in the figures and presented in the corresponding descriptions provided below. Aspects of the invention relate to rotary touch detection in an input device (e.g., computer peripheral devices). Rotary devices (also referred to generally as an "input element"), such as scroll wheel, scroll bars (e.g., "dog bones"), jog/shuttle dial, or the like, are common on many common computer peripheral devices including computer mice, keyboards, or other input devices that allow a user to rotate a rotary device to control aspects of a host computing device (e.g., document scroll, volume, parameter adjustment, etc.) by rotating the rotary device. Additionally, touch sensing on a rotary device can provide additional functionality and improved productivity to the computer peripheral device in a number of useful ways that may improve the user experience. For instance, touch detection may facilitate the stopping of a virtual infinite scroll function (e.g., when the rotary device is physically stopped, but the screen or document continues to scroll) or instantiating other useful functions by a physical tap or touch (e.g., cycling through a list of selectable options, page up/down, option selection, etc.). On the other hand, conventional methods for touch detection (e.g., electrostatic or capacitive sensing) are not always a viable option due to prohibitive cost factors to integrate the sensing system into the rotary device, electromagnetic interference (EMI) and/or electrostatic discharge (ESD), which may interfere with and render capacitive touch sensing systems unreliable, or the need for a conductive coating to facilitate touch detection that may operate to block cosmetic lighting in the rotary device, which can be problematic in modern RGB style devices that require translucent materials (i.e., non-conductive plastics) to allow light to pass through.

Aspects of the present disclosure present embodiments that facilitate touch detection in input devices without requiring any additional sensors or hardware. In some cases, touch detection can be implemented in input devices that are not originally manufactured with touch detection capabilities. This is made possible with a new control system and measurement method that can be combined with a conventional wheel position sensor(s) (e.g., Hall-type, optical, electromagnetic, etc.—configured to detect rotary device rotation/position, but not touch) to achieve accurate user touch detection on a rotary device. In summary, touch detection can be implemented with no additional hardware, no calibration requirements, no interference with existing sensing technology, and can operate to upgrade existing products in the field without touch detection capabilities.

Figure 5:
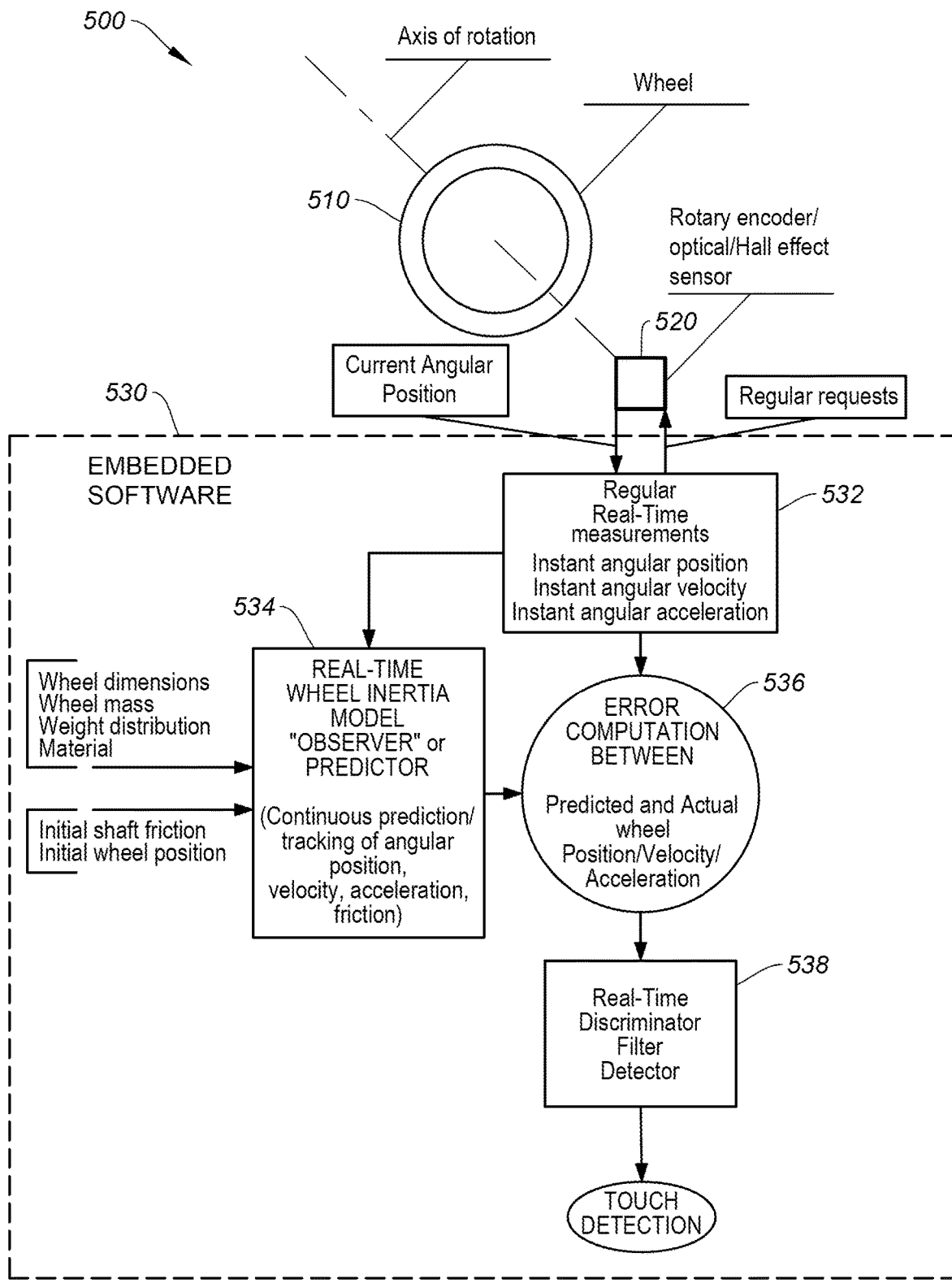
FIG. 5 shows a system for rotary touch detection in an input device, according to certain embodiments.

In some embodiments, touch detection is made possible by tracking a real-time rotation of a rotary device (e.g., input element) via a position sensor, and in parallel perform a real-time prediction of a rotational state of the rotary device based on the sensor reading (see, e.g., FIG. 5). For instance, as the rotary device spins (e.g., scrolling through a long document), the predictor can use physical characteristics of the rotary device (e.g., wheel dimensions, mass, weight distribution, material properties, initial wheel position, initial shaft friction, etc.) to predict real-time inertia of the rotary device. A difference measurement can be made that compares a new, instant angular position, velocity, and/or acceleration with the predicted angular position, velocity, and/or acceleration, and the system can use that difference measurement to determine whether a touch event has occurred. In some aspects, translational movement that may be axial or orthogonal to the axis of rotation for the rotary device can be used to determine a touch event. These aspects and others are described in further detail below in the description that follows.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 shows a simplified example of a computer system 100 that can include any of a variety of host computing devices and computer peripheral devices, including computer peripheral devices that can be configured to perform aspects of the various inventive concepts described herein. Computer system 100 can include computer 110, monitor 120, and input devices including a computer mouse 130 and a keyboard 140. In some embodiments, an input device can be a computer mouse, a keyboard, remote-control device, a game controller (e.g., game pad, joystick, flight stick, etc.) or elements thereof (e.g., hat switch), a media controller device, or other suitable device that can be used to convert analog inputs into digital signals for computer processing. In some cases, keyboard 140 can be a "qwerty" style keyboard, or any suitable input device (e.g., internet-of-things device, AR/VR controller, or the like). For computer system 100, computer mouse 130 and keyboard 140 can be configured to control various aspects of computer 110 and monitor 120, as would be appreciated by one of ordinary skill in the art with the benefit of this disclosure. Monitor 120, computer mouse 130, and keyboard 140 may be referred to as "computer peripheral devices." Computer peripheral devices 120-140 can be communicatively coupled to host computing device 110. The present disclosure provides inventive embodiments of input devices in a form factor of a computer mouse or keyboard, but those of ordinary skill in the art would understand that the novel touch sensing system and methods described herein could be adapted to any rotary device (e.g., scroll wheel, knob, wheel, roller, etc.), which can be referred to as an "input element."

Computer 110 can be any suitable computing device including, but not limited to, a desktop computer, a laptop computer, a tablet or "phablet" computer, a smart phone, a PDA, a wearable device (e.g., smart watches, smart glasses), virtual reality/augmented reality (AR/VR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor 302 of FIG. 3) to control aspects of the host computing device, for instance, via the one or more computer peripheral devices.

Figure 2:
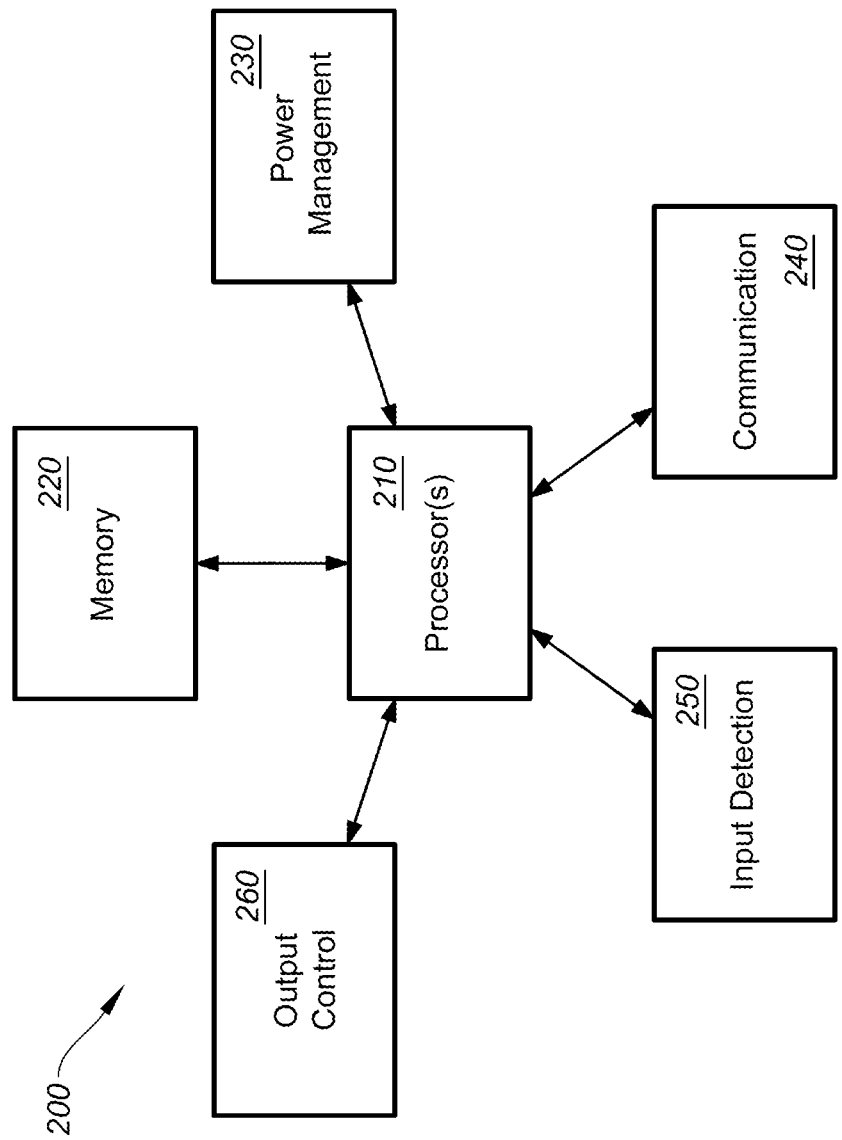
FIG. 2 shows a system for operating a computer peripheral device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices shown or not shown herein but within the wide purview of the present disclosure. System 200 may include processor(s) 210, memory 220, power management system 230, communication module 240, input detection system 250, and output control system 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 may be implemented as separate blocks, or alternatively, more than one system block may be implemented in a single block. In the context described herein, system 200 can be incorporated into any computer peripheral devices (e.g., computer mouse 130, input devices generally, or the like) described or mentioned herein, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer mouse 130 (e.g., system blocks 220-260). Alternatively or additionally, some of system blocks 220-260 may include additional dedicated processor(s), which may work in conjunction with processor(s) 210. For instance, MCUs, pCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor 210 to perform some or all of the various methods and/or control some or all of the various contextual braking systems described throughout this disclosure. In some embodiments, multiple processors may increase performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the computer peripheral device, such as a detected movement of the computer peripheral device, a sensor (e.g., optical sensor, accelerometer, movement sensors as described, e.g., with respect to FIGS. 8-10), activation of one or more input elements (e.g., key structures, buttons, sliders, touch-sensitive regions, contextual braking of said input elements, etc.), or the like. In some aspects, stored data may be aggregated and sent via reports to a host computing device.

In certain embodiments, memory 220 can store the various data described throughout this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute various operations as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications system 240, etc.). In certain embodiments, the functions provided by power management system 230 may be incorporated into processor(s) 210. Alternatively, some embodiments may not include a dedicated power management system. For example, functional aspects of power management system 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection system 250, output control system 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection system 250 can control the detection of a user-interaction with rotary devices on an input device (e.g., via Hall sensors, optical sensors, etc.). For instance, input detection system 250 can detect user inputs from motion sensors, keys (e.g., smart key structures, conventional keys), or buttons (e.g., depressible elements), roller wheels, scroll wheels (e.g., rotation of a scroll wheel in a first (e.g., forward) and second (e.g., backward) direction, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), force sensing (e.g., detecting force on a scroll wheel to rotate in a first or second direction via a force sensitive element such as an FSR, piezo device, etc.), audio based detection such as voice input (e.g., via microphone), or the like, as would be appreciated by one of ordinary skill in the art with the benefit of this disclosure. Alternatively, the functions of input detection system 250 or subset thereof can be subsumed by processor 210, or in combination therewith.

Input detection system 250 may include a movement tracking sub-block that can be configured to detect a relative displacement (movement tracking) of a computer peripheral device. For example, input detection system 250 optical sensor(s) such as IR LEDs and an imaging array of photodiodes to detect a movement of a computer peripheral device relative to an underlying surface. A computer peripheral device may optionally include movement tracking hardware that utilizes coherent (laser) light. Moving tracking can provide positional data (e.g., delta X and delta Y data from last sampling) or lift detection data. For example, an optical sensor can detect when a user lifts the computer peripheral device (e.g., computer mouse 130) off of an underlying surface (also referred to as a "work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or another device). Accelerometers can further determine if the computer peripheral device has been lifted off an underlying surface and can provide movement data that may include the velocity, physical orientation, and acceleration of a computer peripheral device. In some embodiments, gyroscope(s) can be used in lieu of or in conjunction with accelerometer(s) to determine movement or input device orientation.

In certain embodiments, input detection system 250 may incorporate some or all aspects of the novel touch detection system described herein (e.g., as shown in FIG. 5). Processor(s) 210 may work in conjunction with input detection 250 or other suitable aspects of system 200 to perform the novel touch detection methods (e.g., see FIG. 6) described herein. The novel method(s) may be embodied by software, firmware, or a combination thereof, as would be appreciated by one of ordinary skill in the art with the benefit of this disclosure.

In some embodiments, output control system 260 can control various outputs for a corresponding computer peripheral device. For instance, output control system 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular systems, it is to be understood that these systems are defined for convenience of description and are not intended to imply a particular physical arrangement of component parts. Further, the systems need not correspond to physically distinct components. Systems can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection system 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
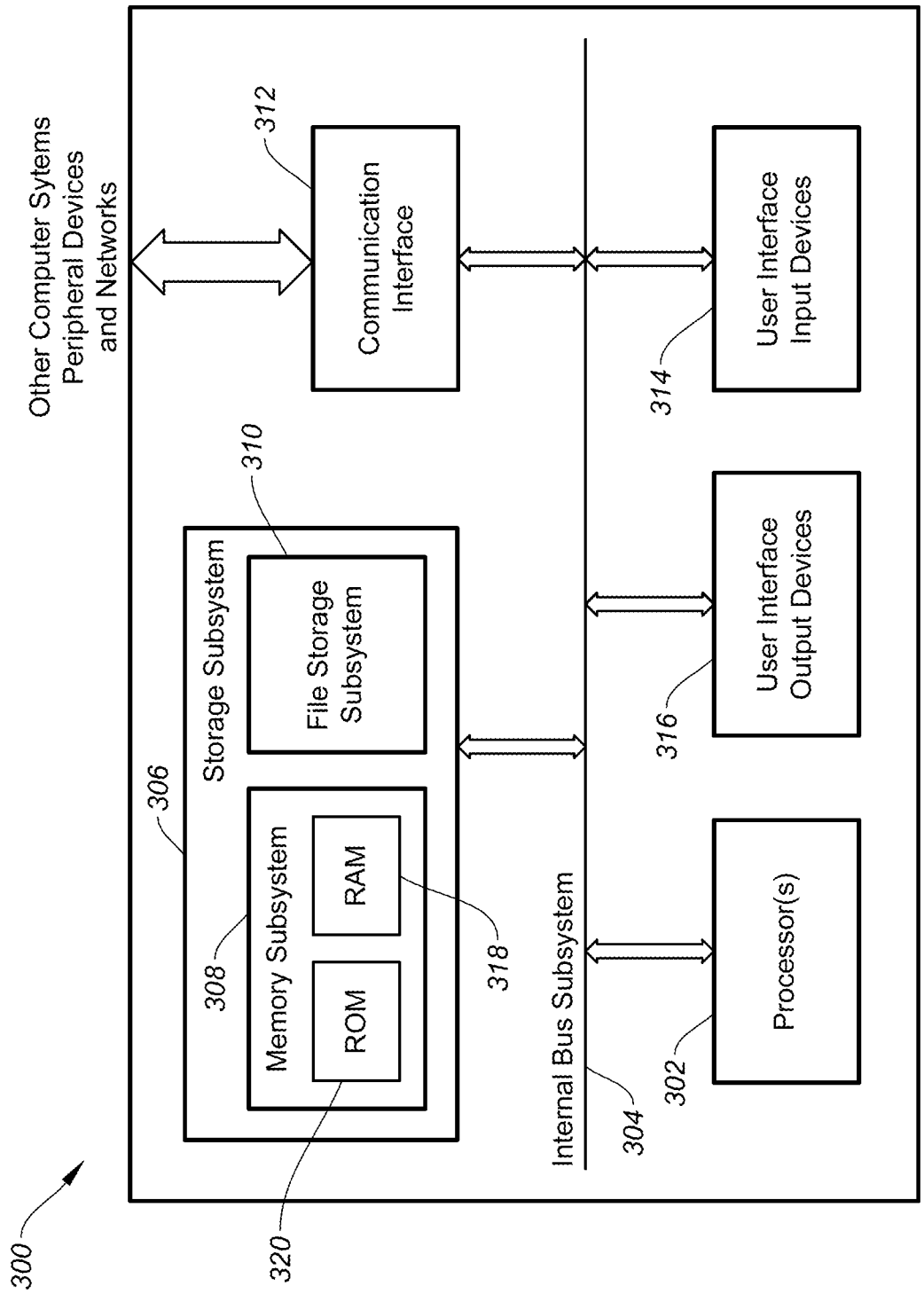
FIG. 3 is a simplified block diagram of a host computing device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Figure 4A:
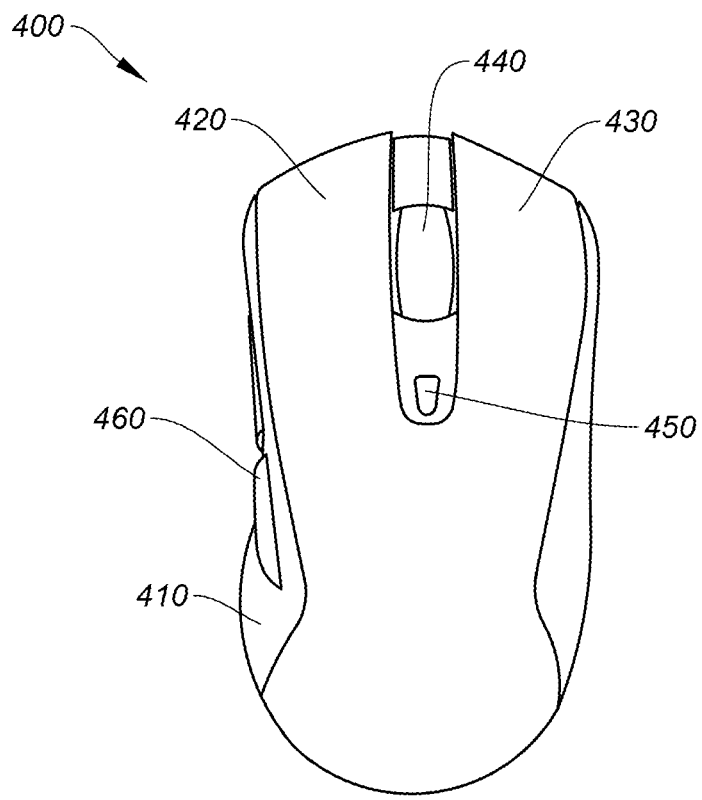
FIG. 4A shows aspects of a computer mouse, according to certain embodiments.

FIG. 4A shows aspects of a computer mouse 400, according to certain embodiments. Computer peripheral device 400 may be similar to computer mouse 130 and can include housing 410 (e.g., the "shell," "chassis," or "body" of the computer peripheral device), left button 420, right button 430, scroll wheel 440 and buttons 450, 460, as well as any other suitable input elements (e.g., additional buttons, side scroll wheels, touch sensors, etc.) or output elements (e.g., light emitting diodes (LEDs), displays, haptic feedback elements, speakers, etc.), and the like. In some cases, button 450 may be a mode selection button to switch computer mouse 400 between one or more modes of operation with different performance characteristics, as would be understood by one of ordinary skill in the art.

In some embodiments, buttons 450, 460 may be configured to switch communication between host computing devices. For instance, some embodiments may have multi-host connectivity such that computer peripheral device 400 may communication with a first host computer (e.g., a PC laptop) and switch to a second host computer (e.g., a Mac computer) in response to a corresponding button press, as further described in patent application Ser. No. 14/884,381, which is incorporated by reference in its entirety for all purposes. Alternatively or additionally, switching between hosts may be achieved by, for example, moving a corresponding cursor to an edge of a display in a "flow" enabled system, as further described in patent application Ser. No. 15/226,770 which is incorporated by reference in its entirety for all purposes. Buttons 450, 460 or any other computer peripheral devices can be configured in any suitable manner and may utilize any suitable function, which can be preset or user programmed (e.g., via corresponding driver software on a host computing device), as would be understood by one of ordinary skill in the art.

Scroll wheel 440 movement (e.g., rotation, translational movement) be detected by one or more position sensors (e.g., Hall type) that can report a translational movement or an angular position, velocity, and/or acceleration of scroll wheel 440 to processor(s) 210. Aspects of the invention can add touch detection capabilities to computer mouse 400 by using motion sensor data corresponding to a movement of scroll wheel 440 in the manner described at least with respect to FIGS. 5-6, as presented below.

Figure 4B:
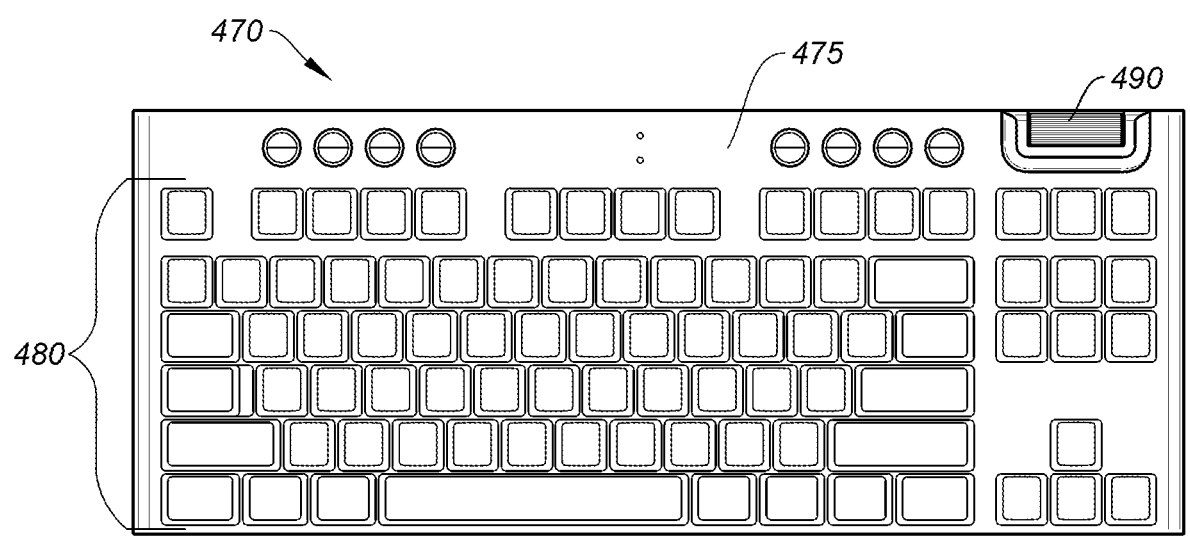
FIG. 4B shows aspects of a keyboard, according to certain embodiments.

FIG. 4B shows aspects of a keyboard 470, according to certain embodiments. Keyboard 470 can include a keyframe 475 (also referred to as a bezel) and plurality of different types of keys 480 configured therein, including conventional "querty" keys, function keys, number pad keys, and may include any suitable type of input element (e.g., buttons, sliders, switches, etc.). Keyboard 470 further includes scroll bar ("dog bone") 490. Aspects of the invention can add touch detection capabilities to keyboard 470 by using position sensor data corresponding to a rotation of scroll bar 490 in the manner described at least with respect to FIGS. 5-6, as presented below.

As noted above, aspects of the invention relate to rotary touch detection in an input device (e.g., computer peripheral devices) without the need for additional touch sensing hardware. Touch sensing on a rotary device can provide greater functionality and improved productivity on the computer peripheral device in a number of useful ways that can improve the UX. For instance, touch detection may facilitate the stopping of a virtual infinite scroll function or instantiating other useful functions by a physical tap or touch (e.g., cycling through a list of selectable options, page up/down, option selection, etc.). As mentioned, conventional methods for touch detection (e.g., electrostatic or capacitive sensing) are not always a viable option due to prohibitive cost factors to integrate the sensing system hardware into the rotary device, EMI and/or ESD, which may interfere with and render capacitive touch sensing systems unreliable, or the need for a conductive coating to facilitate touch detection that may operate to block cosmetic lighting in the rotary device, which can be problematic in modern RGB style devices that require translucent materials (i.e., non-conductive plastics) to allow light to pass through.

In some cases, touch detection can be implemented in input devices that are not originally manufactured with touch detection capabilities. This is made possible with a new control system and measurement method that can be combined with a conventional wheel position sensor(s) (e.g., Hall-type, optical, electromagnetic, etc.—configured to detect rotary device rotation/position, but not touch) to achieve accurate user touch detection on a rotary device. In summary, touch detection can be implemented with no additional hardware, no calibration requirements, no interference with existing sensing technology, and can operate to upgrade existing products in the field without touch detection capabilities.

FIG. 5 shows a system 500 for rotary touch detection in an input device, according to certain embodiments. Although many of the embodiments described herein refer to a scroll wheel in a computer mouse 130/400 to employ novel touch detection systems and methods, it should be understood that the concepts described herein are applicable to any suitable rotary device, as would be appreciated by one of ordinary skill in the art with the benefit of this disclosure.

In some embodiments, system 500 can include a rotary device 510 ("scroll wheel," "wheel," "rotary controller"), one or more sensors 520, and embedded software 530 (e.g., firmware) that can include functional blocks including a sensor measurement block 532, predictor block 534, error computation block 536, and discriminator block 538. Each functional block 532-538 may be embodied as software and/or firmware in the input device (e.g., computer mouse 400, keyboard 470) in memory 220, input detection block 250, processor 210, other functional blocks, or any combination thereof. One of ordinary skill in the art with the benefit of this disclosure would appreciate the many modifications, variations, and alternative embodiments thereof.

Rotary device 510 can be a scroll wheel, scroll bar, knob, dial, or any other suitable input element on an input device that rotates on an axis and is configured to be rotated by a user that is typically used to control one or more functions on a host computing device (e.g., scroll though documents, webpages, or the like; control audio and/or video attributes, etc.). One of ordinary skill in the art with the benefit of this disclosure would appreciate the many variations and alternative embodiments thereof and their application to the novel embodiments described herein.

Rotary sensor 520 can include any suitable sensor(s) configured to detect a movement of rotary device 510 including rotation and, in some embodiments, lateral translation. Some non-limiting examples include a rotary encoder, a Hall effect sensor, and an optical sensor. A rotary encoder is an electro-mechanical device that is operable to convert the angular position or rotation of a shaft of a rotary device into an electrical signal. A rotary encoder typically includes a rotating shaft with an attached coded disc and a stationary sensor that detects the position of the disc, and as the shaft rotates, the disc generates a unique digital or analog output signal corresponding to the angle or direction of the rotation of the rotary device. A Hall effect sensor is a transducer that converts the presence of a magnetic field into an electrical signal. Utilizing the principle of the Hall effect, which states that when a magnetic field is applied perpendicular to a current-carrying conductor, a voltage difference is generated across the conductor. An optical sensor for a rotary device typically includes an LED and a photodiode positionally configured in a way that the light from the LED shines onto the scroll wheel and is reflected back toward the photodiode. As the rotary device rotates, the light reflection pattern changes, and this change is detected by the photodiode and can be interpreted as position, velocity, and/or acceleration data.

In some embodiments, sensor measurement block 532 can be configured to request regular real-time measurement of the rotary device, which can include an instant angular position, angular velocity, and/or angular acceleration. In some embodiments, the measurements may occur at the equal time intervals with a duration several times smaller than the duration of the finger touch process (e.g., 1-5 ms), however slower or faster intervals, and non-equal intervals are possible. The rotary device position acquisition time intervals may be governed by the rotary position sensor itself or the microcontroller (e.g., processor(s) 210, 302, another dedicated processor or module, or a combination thereof) managing the sensor sampling. As noted above, the rotary sensor(s) can measure and report the instant rotary device position at the current sampling interval, the wheel angular velocity and the wheel angular acceleration. By way of example, modern Hall sensors usually have a programmable polling rate maxing at 1 kHz. Also the polling rate selection impacts the power consumption of the cordless HID devices. Other values, higher or lower than 1 kHz are possible, as would be appreciated by one of ordinary skill in the art with the benefit of this disclosure. The angular position, velocity, and acceleration is typically associated with rotation of the rotary device on an axis corresponding to one dimension of movement (e.g., x-axis). Some embodiments may further read translational movement data for touch detection, as further described below. Some examples may be small movements of the rotary device in an up/down direction (e.g., z-axis) or left/right direction (e.g., y-axis), which may occur in response to a small force imparted by a user while touching the rotary device. In some embodiments, the predictor block 534 may be useful when the position of the scroll wheel is needed but cannot be measured directly by polling the wheel position sensor (e.g., Hall sensor, optical sensor). In some aspects, any movement (not necessarily in the main plane) can trigger the touch detection algorithm. The discriminator module can then discard the trigger as either system noise or determined to be a user action. In certain embodiments, the inertial model can include a viscosity model for the grease/oil in the ball/sleeve bearings of the scroll wheel to better track the variation of the angular velocity more precisely during the free spinning of the scroll wheel. The ambient temperature can also modify the viscosity coefficient of grease, therefore affecting the mechanical performance of sleeve bearing. A more accurate and detailed model can be more sensitive to very gentle and/or brief user interactions, which can help the discriminator more accurately identify system noise and user interactions with the scroll wheel. Referring back to FIG. 5, the sensor measurement block 532 outputs the received movement data (e.g., rotation data, translational movement data) to the predictor block 534 and the error computation block 536.

Predictor block 534 can operate as a real-time inertia model (also referred to as a "predictor" or "observer") for the rotary device that may be configured to make real-time, continuous predictions of one or more of the angular position, angular velocity, angular acceleration, and/or friction of the rotary device. Using physical characteristics of the rotary device, such as one or more of the rotary device dimensions, mass, weight distribution, composition of material, and the like, as well as the shaft friction (e.g., bearing friction/viscosity) and the initial wheel position, the predictor block 534 can model the rotation physics (e.g., inertia) of the rotary device and predict what the angular position, angular velocity, and/or angular acceleration of the rotary device will be some time after receiving the movement data (e.g., 10 ms, 100 ms, 1 s, etc.) from the sensor measurement block 532. For example, if a user spins the rotary device quickly in a free-wheel or ratchet mode of operation (e.g., to scroll through a long document), the rotary device will spin at a decreasing rate that is predictable based on its physical characteristics, and thus an approximation of the rotary device position, velocity, and/or acceleration at some time thereafter (e.g., typically within 20 seconds, although longer rotation times are possible) can be calculated. In some implementations, the real-time inertial model may update its modeled parameters (e.g., friction) with a time constant of several hundred times longer than the sampling interval. Predictor block 534 outputs the predicted inertia (e.g., predicted angular position, velocity, and/or acceleration) to error computation block 536. As such, the predictor algorithm can be simple, taking into account only the wheel inertia and friction, which can be less accurate and, in some cases, more robust, or the predictor algorithm may be very sophisticated, but will require more precise calibration and a better representation of the system (e.g., certain parametric variation during the product life and production process variation). Both implementations (complex and simple, and anything in between) may have advantages and disadvantages, as would be appreciated by one of ordinary skill in the art with the benefit of this disclosure.

In some embodiments, error computation block 536 can be configured to determine the error (e.g., difference measurement) between the actual rotary device position, velocity, and/or acceleration (e.g., based on the latest real-time measurements made by sensor measurement block 532) and the predicted corresponding values made by predictor block 534. Specifically, some embodiments take the instant angular position/velocity and acceleration and subtracts from them the predicted angular position/velocity and acceleration and sends the result of this subtraction computation to the real-time discriminator block 538.

The real-time discriminator 538 may be configured to perform real-time discriminator, filter, and detector functions, according to certain embodiments. Based at least in part on the error computation between the actual and predicted position/velocity/acceleration measurements, the discriminator block 538 can determine that a touch event has occurred on the rotary device when the calculated difference is greater than a difference threshold value. The discriminator can analyze an error magnitude from the raw error value (e.g., including multiple dimensions: angle, angular velocity, angular acceleration) and can output the real-time error peak value. Thus, the discriminator can provide the instant error magnitude value together with the "confidence level" value. The "confidence level" value gives the amount of error in the error magnitude value (e.g., how much the system can trust the error). The filter portion integrates the error peak value provided by the discriminator (e.g., via smoothening, low-pass filtering, etc). The detector can compare the filtered error value to a programmable threshold. Once beyond the threshold, the detector module can inform upper software layers about the user touch being detected. In some aspects, the filter topology and detector thresholding is defined by the "confidence level" value (e.g., typically distributed from 0 to 1). For example, if the confidence level is higher than 0.5, the filter can be simplified, since the confidence level is high enough. Otherwise, a longer integration period may be used to, for instance, take and average the error to be more conclusive on the touch detection. The discriminator may also consider the modality (which exactly real-time values are compared and taken from the model) and the importance (how important the value contribution to the error magnitude, imagine calculating the projection of the vector to the value axis). The difference threshold value may be preset or programmable. When the difference threshold value is reached, a touch event may be sent to upper-level application software, as noted above. By way of example, if the observer/predictor module (e.g., predictor block 534) provides the angular position, angular velocity, and angular acceleration. Real-time measurements are also provided by the sensor module. The error calculation may occur separately on three pairs of values and provided to the discriminator. In some embodiments, the discriminator can operate based on the selected modality and the importance of the values (e.g., dynamic configuration).

In operation, touch detection may be based in part on the precise inertial mechanical model of the rotary device (e.g., scroll wheel, knob, dog bone, crown). The many variations of the rotary device can have some common features, including a rotational axis (e.g., single axis of rotation), a well-defined and constant rotational mass and geometry, an axis friction in the rotation of the rotary device (e.g., sleeve/ball bearings), and a precise wheel position sensor capable of sampling the wheel rotary position in well-timed intervals (e.g., equal time intervals, time-stamped intervals, etc.). Some embodiments may utilize a factory calibrated or predefined software real-time model of the rotary device inertia interacting with the friction force of the ball/sleeve bearing and the real-time measurements (via sensor measurement block 532) to compute the instant error between these values, as depicted in FIG. 5. In some cases, the rotary device inertia may be modeled post-manufacturing, as would be appreciated by one of ordinary skill in the art with the benefit of this disclosure.

Alternative or additionally, a 3D rotary device position model can be employed. For example, 3D Hall sensors may be used in existing hardware (even though X/Y axes may only be used without use of Z axis data). This may be useful, for instance, to better authenticate a touch detection. For instance, shaking a computer mouse without touching the scroll wheel may generate a z-movement along the axis of rotation, but because the wheel may not be interacting with the user's finger at the same moment, the shaking can be successfully discarded by the discriminator 538 and not considered as the user touch action. By adding the sensing modality a stronger error resilience/rejection will be achieved.

In some embodiments, sensing modality can be used as noted above. Sensing modality can be used, for instance, when mechanical model of the wheel changes its configuration, e.g., during free rotation at an RPM a ratchet mode can be automatically engaged (e.g., via smart shifting). This dynamic transition can change the forces applied to the wheel from a simple friction to the magnetic ratchet periodic force field. Sensing modality can also be useful when the "detection confidence level" value is too weak (e.g., where the touch detection may become inconclusive) or quite strong so that the discrimination/filtering algorithm can be simplified (e.g., to reduce the power consumption). Detection confidence level can be the value provided together with the error magnitude by the discriminator.

Figure 6:
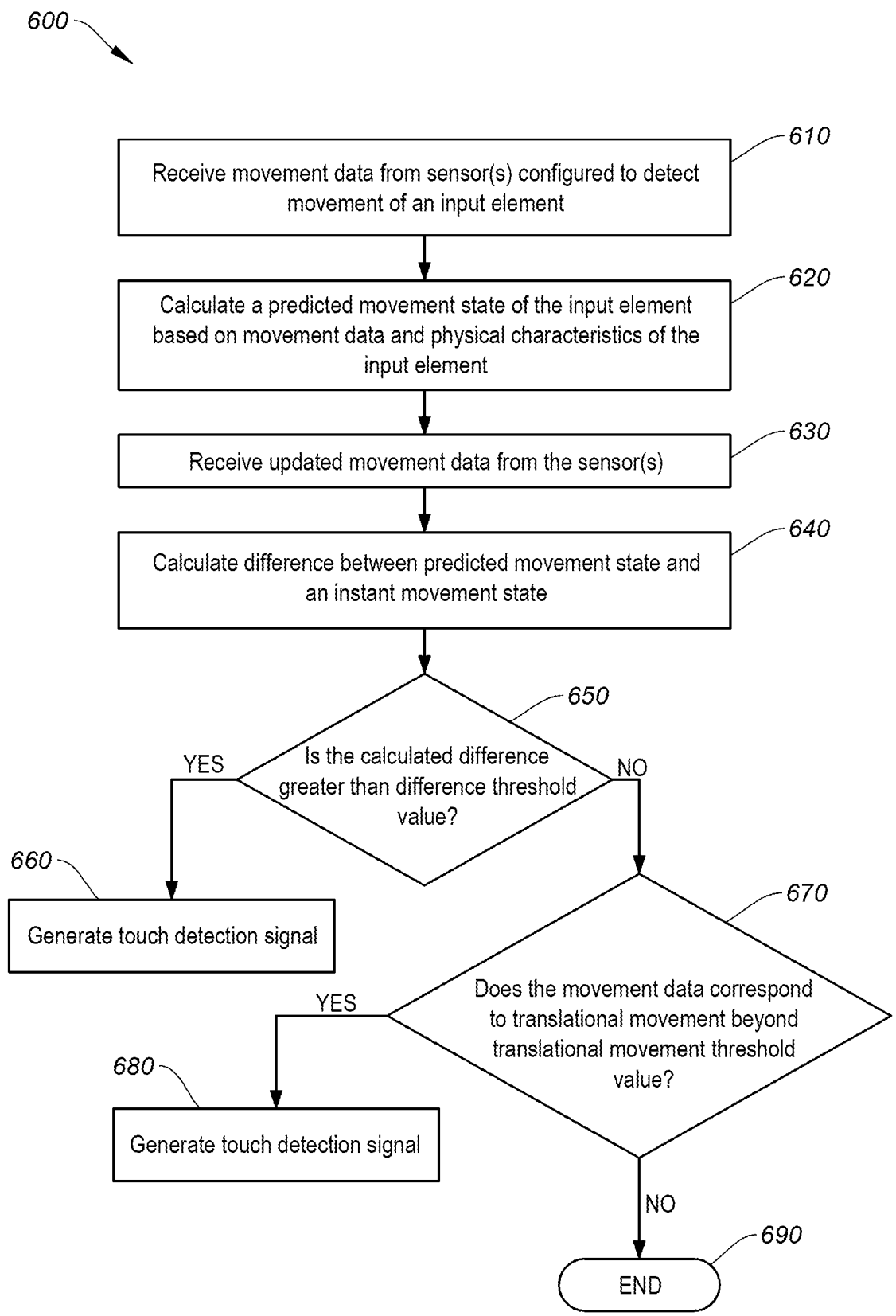
FIG. 6 is a simplified flow chart showing a method of operating a rotary touch detection system in an input device, according to certain embodiments.

FIG. 6 is a simplified flow chart showing aspects of a method 600 for operating a rotary touch detection system in an input device, according to certain embodiments. Method 600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 600 can be performed by aspects of processor(s) 210, 302, or a combination thereof.

At operation 610, method 600 can include receiving movement data (e.g., angular rotation data, translation data) from one or more sensor(s) 520 configured to detect a rotation of a rotary device on a computer peripheral device, according to certain embodiments.

At operation 620, method 600 can include calculating a predicted rotational state of the rotary device after a period of time (e.g., 100 ms) based on the movement data and physical characteristics of the rotary device, according to certain embodiments.

At operation 630, method 600 can include receiving updated movement data from the sensor after the period of time, according to certain embodiments.

At operation 640, method 600 can include calculating a difference between the predicted rotational state and an instant rotational state of the rotary device, the instant rotational state based on the updated rotation data, according to certain embodiments.

At operation 650, method 600 can include determining that a touch event has occurred on the rotary device when the calculated difference between the predicted rotational state and the instant rotational state is greater than a difference threshold value (operation 660), according to certain embodiments.

At operation 650, when the calculated difference is not greater than the difference threshold value, method 600 can include determining whether the movement data corresponds to a translational movement beyond a translational movement threshold value (operation 670), according to certain embodiments.

At operation 670, when the translational movement is greater than the translational movement threshold value, method 600 can include generating a touch detection signal (operation 680).

At operation 670, when the translational movement is less than the translational movement threshold value, method 600 ends (operation 690).

It should be appreciated that the specific steps illustrated in FIG. 6 provide a particular method 600 for operating a rotary touch detection system in an input device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Figure 7:
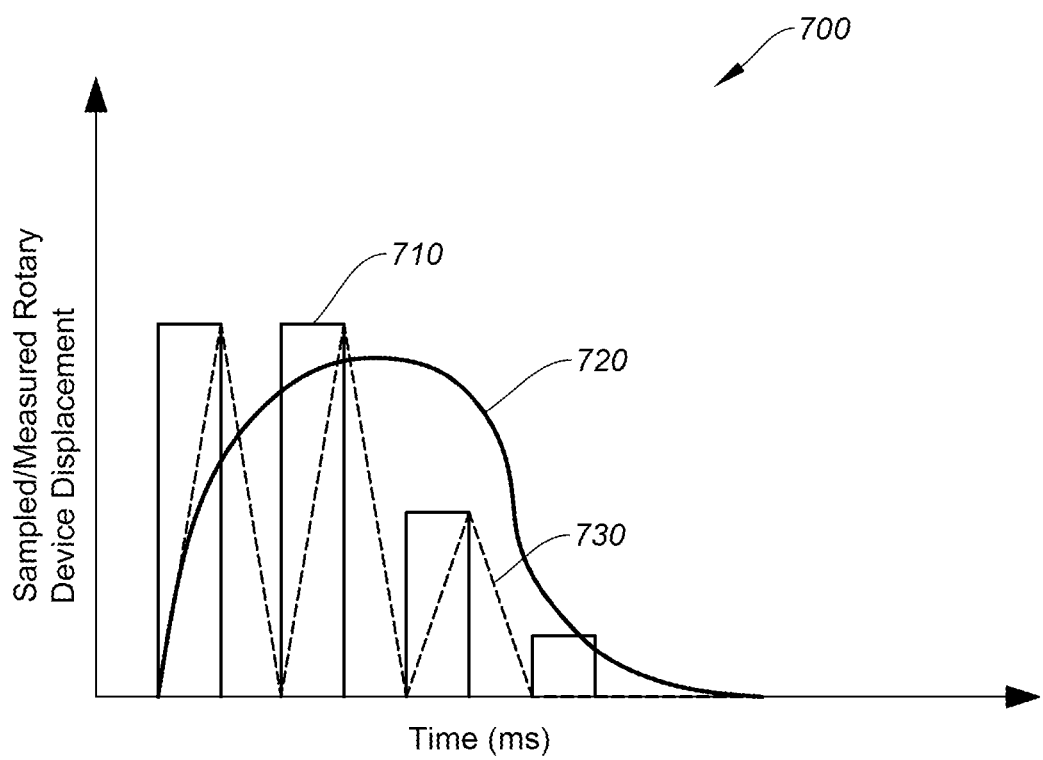
FIG. 7 shows a graph depicting of a sample output of the discriminator block, according to certain embodiments.

In some embodiments, a smoothing filter may be used with dead reckoning and median filters, which may operate to exclude very small motions and oscillations around a current position for better accuracy. FIG. 7 shows a graph 700 depicting of a sample output of the discriminator 538, according to certain embodiments. Graph 700 shows raw output data 710 from the sensor (2) 520, the inertial model 720, and an integrator output with a median filter 730, which can be used to determine a touch event. In operation, the mechanically aware inertial model gives an excellent angular resolution with near zero dead reckoning (e.g., high sensitivity/no oscillations), since the previous rotary device position, rotational speed (zero), are considered. When a user touches the rotary device, due to the axis free play in the bearings the displacement will be sufficient to be registered. The inertial model determines a difference between the measurement signal noise and the "useful" information. That is, when the touch occurs, the rotary device will be displaced along at least one of the X/Y/Z axes, which will be sufficient to integrate this motion and can be based on the known inertia detect the touch.

Some examples are now described to explain how certain embodiments are configured to respond to different types of touch inputs. In a first example, a slow wheel rotation at continuous speed (based on the wheel inertia) is followed by a brief user touch. In this case, the sampling algorithm based on the raw data may not properly detect the user action on the wheel due to the measurement precision/sampling/small alternation of the rotational speed and acceleration. However, the predictor block 534 can compare the dynamic speed decay (based on inertia and estimated friction) versus the instantaneous sensor readings and conclude whether the user instantly slowed down the motion of the rotary device.

In another example, a user's finger is in continuous contact with the rotary device and the predictor block the observer can see the large difference between the free rotation model and the model based on the finger touch (thresholding to see whether the wheel freely moves under inertia or jerky due to the user motion). For instance, when a user's finger is in contact with the scroll wheel there can be a big difference between the instant angular position, velocity, and acceleration obtained from the sensor and the values provided by the predictor/observer. Therefore, the error value and the confidence level can be high (from the discriminator), which is filtered and detected, then formulated as touch detection for the upper layers. In simpler terms, if the instant and predicted angular position, velocity, acceleration were very similar, that may be interpreted as no perturbation is detected, and if they are very different, then something must have interfered (e.g., touched) the scroll wheel to cause said difference.

In a further example, when the magnetic ratchet feedback profile is engaged in the rotary device, the system 500 knows the static position of the magnetic poles and expects some motion alternation versus simple decayed rotation. That is, in between static positions, the rotary device will decelerate by approaching the magnetic pole and then will accelerate per the ratcheting effect. Ratcheting motion is conventionally not possible to program into a standard filter with a fixed configuration. In systems with freewheeling and ratcheting modes, harmonic rotational velocity of the rotary device under a magnetic ratchet mode can be continuously estimated via system 500 and the user touch can be immediately detected even in the ratcheting mode of operation.

In another example, in a magnetic ratchet mode of operation, the rotary device may oscillate around its static magnetic pole position. In such cases, the raw sensor data or smoothening/median algorithms cannot provide the precision together with some oscillation protection. Whereas the predictor block can estimate the oscillating position decay and instead provide the static position to the application (intended rotary device position via separation of the physical model properties).

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for detecting a touch on a rotary device on a computer peripheral device without a separate touch sensor, comprising:
   receiving rotation data at a first time from a rotation sensor configured to detect a rotation of a rotary device on a computer peripheral device;
   determining a predicted rotational state of the rotary device at a second time after a period of time with an expected speed decay based on:
      the rotation data at the first time; and
      physical characteristics of the rotary device;
   subsequent to determining the predicted rotational state, receiving updated rotation data from the rotation sensor at the second time after the period of time;
   calculating a difference between the predicted rotational state and an instant rotational state of the rotary device as provided by the rotation sensor, the instant rotational state based on the updated rotation data at the second time; and
   determining that a touch event has occurred on the rotary device when the calculated difference between the predicted rotational state and the instant rotational state is greater than a difference threshold value.

2. The method of claim 1 wherein the rotation data includes at least one of angular position data, angular velocity data, or angular acceleration data.

3. The method of claim 2 wherein the sensor is a Hall-Type Sensor configured to detect movement of the rotary device in at least two dimensions including:
   a first dimension of the at least two dimensions that is an axis of rotation for the rotary device and includes the at least one of the angular position, velocity, or acceleration data, and translational movement along the first dimension; and
   a second dimension of the at least two dimensions that is orthogonal to the first dimension and includes translational movement along the second dimension,
   wherein determining that the touch event has occurred on the rotary device is further based on translational movement along the first or second dimension that is beyond a translational movement threshold.

4. The method of claim 3 wherein the sensor is further configured to detect translational movement of the rotary device in a third dimension that is orthogonal to the first and second dimensions,
   wherein determining that the touch event has occurred on the rotary device is further based on translational movement along the third dimension.

5. The method of claim 1 wherein the physical characteristics of the rotary device include at least one of:
   rotary device dimensions;
   rotary device mass;
   rotary device weight distribution;
   rotary device material;
   rotary device rotational friction; and
   rotary device initial rotational position.

6. The method of claim 1 wherein the computer peripheral device is a computer mouse or a keyboard and the rotary device is a scroll wheel, scroll bar, or rotary element.

7. The method of claim 1 wherein the step of determining a predicted rotational state of the rotary device is performed by software imbedded in the computer peripheral device using the physical characteristics of the rotary device which are stored in a memory of the computer peripheral.

8. A system for detecting a touch on a rotary device on a computer peripheral device without a separate touch sensor, comprising:
   one or more processors;
   one or more non-transitory, computer-readable storage mediums containing instructions configured to cause the one or more processors to perform operations including:
   receiving rotation data at a first time from a rotation sensor configured to detect a rotation of a rotary device on a computer peripheral device;
   determining a predicted rotational state of the rotary device at a second time after a period of time with an expected speed decay based on:
      the rotation data at the first time; and
      physical characteristics of the rotary device;
   subsequent to determining the predicted rotational state, receiving updated rotation data from the rotation sensor at the second time after the period of time;
   calculating a difference between the predicted rotational state and an instant rotational state of the rotary device as provided by the rotation sensor, the instant rotational state based on the updated rotation data at the second time; and
   determining that a touch event has occurred on the rotary device when the calculated difference between the predicted rotational state and the instant rotational state is greater than a difference threshold value.

9. The system of claim 8 wherein the rotation data includes at least one of angular position data, angular velocity data, or angular acceleration data.

10. The system of claim 9 wherein the sensor is a Hall-Type Sensor configured to detect movement of the rotary device in at least two dimensions including:
   a first dimension of the at least two dimensions that is an axis of rotation for the rotary device and includes the at least one of the angular position, velocity, or acceleration data, and translational movement along the first dimension; and
   a second dimension of the at least two dimensions that is orthogonal to the first dimension and includes translational movement along the second dimension,
   wherein determining that the touch event has occurred on the rotary device is further based on translational movement along the first or second dimension that is beyond a translational movement threshold.

11. The system of claim 10 wherein the sensor is further configured to detect translational movement of the rotary device in a third dimension that is orthogonal to the first and second dimensions,
wherein determining that the touch event has occurred on the rotary device is further based on translational movement along the third dimension.

12. The system of claim 8 wherein the physical characteristics of the rotary device include at least one of:
rotary device dimensions;
rotary device mass;
rotary device weight distribution;
rotary device material;
rotary device rotational friction; and
rotary device initial rotational position.

13. The system of claim 8 wherein the computer peripheral device is a computer mouse or a keyboard.

14. The system of claim 8 wherein the rotary device is a scroll wheel, scroll bar, or rotary element.

15. A non-transitory computer-readable medium containing program instructions for causing one or more processors to perform operations including:
receiving rotation data at a first time from a rotation sensor configured to detect a rotation of a rotary device on a computer peripheral device;
determining a predicted rotational state of the rotary device at a second time after a period of time with an expected speed decay based on: the rotation data at the first time; and
physical characteristics of the rotary device;
subsequent to determining the predicted rotational state, receiving updated rotation data from the rotation sensor at the second time after the period of time;
calculating a difference between the predicted rotational state and an instant rotational state of the rotary device as provided by the rotation sensor, the instant rotational state based on the updated rotation data at the second time; and
determining that a touch event has occurred on the rotary device when the calculated difference between the predicted rotational state and the instant rotational state is greater than a difference threshold value.

16. The non-transitory computer-readable medium of claim 15 wherein the rotation data includes at least one of angular position data, angular velocity data, or angular acceleration data.

17. The non-transitory computer-readable medium of claim 16 wherein the sensor is a Hall-Type Sensor configured to detect movement of the rotary device in at least two dimensions including:
a first dimension of the at least two dimensions that is an axis of rotation for the rotary device and includes the at least one of the angular position, velocity, or acceleration data, and translational movement along the first dimension; and
a second dimension of the at least two dimensions that is orthogonal to the first dimension and includes translational movement along the second dimension,
wherein determining that the touch event has occurred on the rotary device is further based on translational movement along the first or second dimension that is beyond a translational movement threshold.

18. The non-transitory computer-readable medium of claim 17 wherein the sensor is further configured to detect translational movement of the rotary device in a third dimension that is orthogonal to the first and second dimensions,
wherein determining that the touch event has occurred on the rotary device is further based on translational movement along the third dimension.

19. The non-transitory computer-readable medium of claim 15 wherein the physical characteristics of the rotary device include at least one of:
rotary device dimensions;
rotary device mass;
rotary device weight distribution;
rotary device material;
rotary device rotational friction; and
rotary device initial rotational position.

20. The non-transitory computer-readable medium of claim 15 wherein the rotary device is a scroll wheel, scroll bar, or rotary element.

* * * * *